Dec. 27, 1966 D. A. WETHERBY ETAL 3,294,915
PHASING CIRCUIT FOR F.M. STERO RECEIVER
Filed July 29, 1963
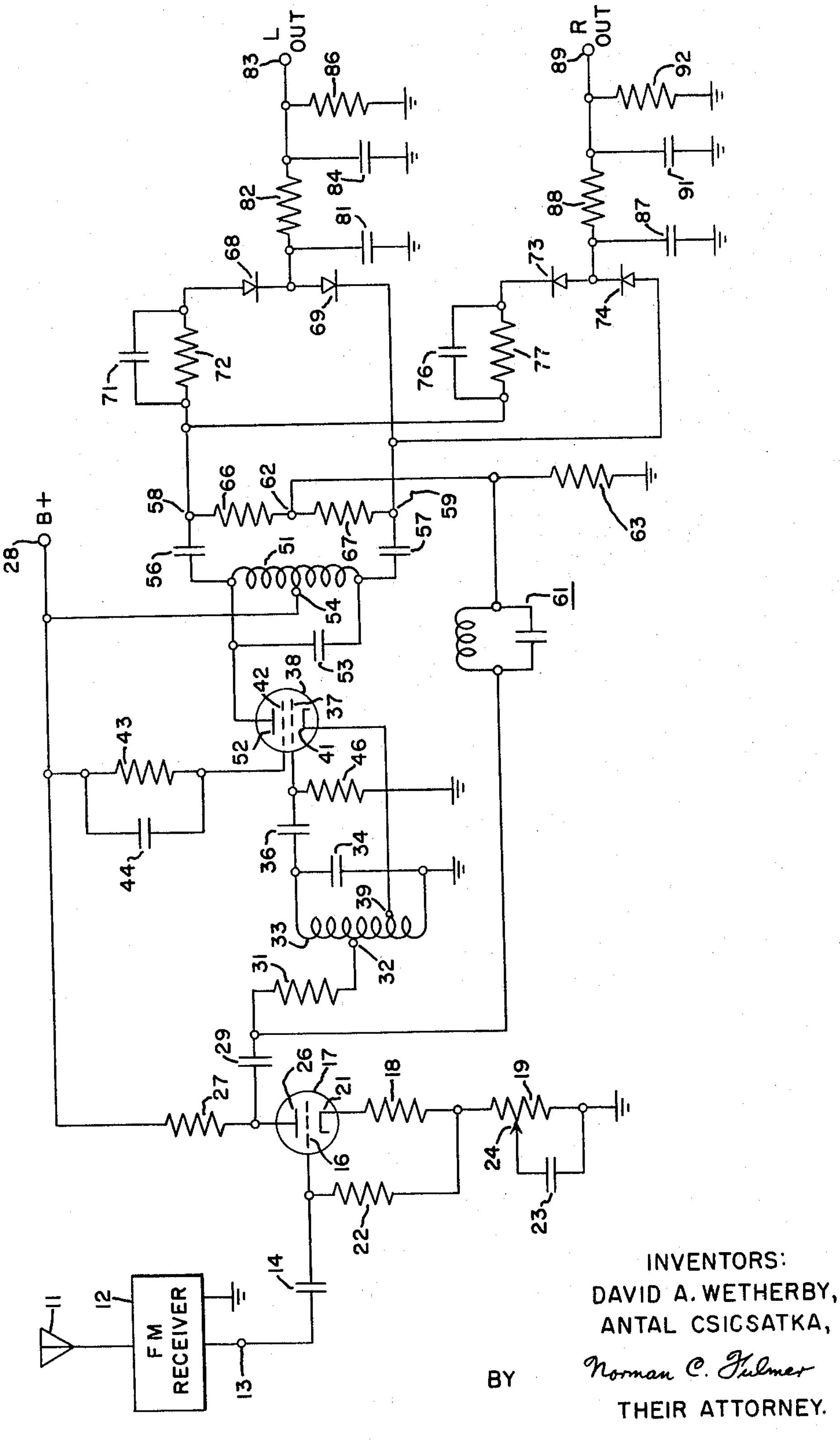
INVENTORS:
DAVID A. WETHERBY,
ANTAL CSICSATKA,
BY Norman C. Fulmer
THEIR ATTORNEY.

United States Patent Office 3,294,915

Patented Dec. 27, 1966

3,294,915

PHASING CIRCUIT FOR F.M. STEREO RECEIVER

David A. Wetherby, Sauquoit, and Antal Csicsatka, Utica, N.Y., assignors to General Electric Company, a corporation of New York Filed July 29, 1963, Ser. No. 298,341
4 Claims. (Cl. 179—15)

This invention relates to improvements in circuits used to derive separate stereophonic signals from the type of signal information conveyed in accordance with the present Federal Communications Commission standards for frequency-modulation stereophonic transmission.

In this system, audio signals L and R, which represent respectively the audio signals generated by left and right microphones, are transmitted by modulating the frequency of a main carrier in accordance with the amplitude variation of the sum of the two signals, i.e., L+R, and the main carrier also is frequency modulated with the amplitude variations of the sideband products resulting from an amplitude modulation of a 38 kilocycle subcarrier with a difference combination of the two stereo signals, i.e. L—R. The 38 kilocycle subcarrier is suppressed so that it does not accompany the other components of the broadcast signal. A subharmonic 19 kilocycle pilot signal is transmitted, which functions as a reference signal at receivers for reconstituting the 38 kilocycle subcarrier.

The combination of the L+R signal, the L—R sidebands of the suppressed subcarrier, and the pilot signal, is called the "composite" signal.

In order to derive the separate L and R audio signals from the composite signal, it has heretofore been proposed, in accordance with well-known theory, that one of these signals be derived by sampling the composite signal at times corresponding to the positive excursions of the 38 kilocycle suppressed subcarrier and that the other stereo signal be derived by sampling the composite signal at times corresponding to the negative excursions of the 38 kilocycle subcarrier wave. This sampling is performed by a sampling circuit that is controlled by a 38 kilocycle switching signal derived in a switching signal generator from or under the control of the pilot signal. For example, if samples of the left stereo signal L are obtained during excursions of the switching signal corresponding in time to positive excursions of the subcarrier, then samples of the right stereo signal R are obtained during excursions of the switching signal corresponding in time to negative excursions of the subcarrier. Each of the signals L and R is then frequency de-emphasized, if they have been pre-emphasized at the transmitter (in well-known manner), so as to yield the original audio signals L and R at separate outputs for application to separate "left" and "right" loudspeakers.

The aforesaid sampling of the composite signal is conveniently achieved by a sampling circuit comprising two or more diodes which are alternately switched into conduction by means of the switching signal which alternates at the frequency rate of the 38 kc. subcarrier. This switching signal must be properly phased with respect to the L—R sidebands in order for the sampling circuit to provide L and R signals having adequate amplitude and which are properly electrically separated from each other.

In certain F.M. stereo receiver circuits, the L—R sidebands are fed through circuits whereby they become delayed in time prior to the sampling process. For example, in a receiver employing a filter circuit for increasing the amplitude of the L—R sidebands with respect to the L+R signal in order to improve the electrical separation of the L and R output signals, the L—R sidebands become delayed in time. Such a circuit is disclosed and claimed in patent application Serial Number 269,374, filed April 1, 1963, and assigned to the same assignee as the present invention.

A previously known way to compensate and correct for the aforesaid time delay of the L—R sidebands, is to delay the switching signal a corresponding amount by slightly detuning one or more of the tuned circuits in the path of the switching signal and of the pilot signal prior to its control of the switching signal. However, it is sometimes difficult to achieve and maintain this detuning accurately, and such detuning tends to narrow the frequency range of "lock-in" or control of the switching signal by the pilot signal. Also, such detuning causes the signal to pass through the tuned circuit on a slope of its characteristic curve which tends to cause the circuitry to lose proper timing of the switching signal vary rapidly when the tuned circuit drifts due to temperature effects.

An object of the invention is to provide an improved F.M. stereo receiver circuit.

Another object is to provide an improved circuit, in an F.M. stereo receiver, for achieving proper phasing of a switching signal with respect to time-delayed L—R sidebands.

A further object is to achieve proper phasing of a switching signal without the necessity of detuning resonant circuits.

Other objects will be apparent from the following description and claims, and from the drawing.

The invention comprises, briefly and in its preferred embodiment, a resistance-capacitance coupling network connected between a tuned output circuit of the switching signal generator and the sampling circuit which performs the switching function for deriving the L and R stereo audio signals. This coupling network is given a time constant such as to delay the switching signal so that it will switch the switching circuit in proper phase with respect to the time-delayed L—R sidebands. Further, in accordance with the invention, this novel coupling takes the place of, and eliminates the need for, a secondary winding normally employed between the output tuned circuit of the switching signal generator and the switching circuit.

The single figure of the drawing is an electrical schematic diagram showing a preferred embodiment of the invention.

Now referring to the drawing, an antenna 11 picks up the F.M. stereo signal in normal manner, and applies it to an F.M. receiver circuit 12 which normally includes a mixer circuit, intermediate amplifier stages, and a demodulator of the limiter-discriminator type or ratio-detector type. The output signal of the F.M. receiver 12 comprises, at the output terminal 13 thereof, the composite signal which comprises the L+R signal combination in a range of from 50 to 15,000 cycles per second, a pilot signal (at 19 kilocycles per the FCC standards), and L—R sidebands of a suppressed amplitude modulated subcarrier, these sidebands extending between 23 kc. and 53 kc. The composite signal is fed through a capacitor 14 to the control grid 16 of a vacuum tube amplifier 17. A bias resistor 18 and a potentiometer resistance element 19 are connected, in the named order, between the cathode 21 of tube 17 and electrical ground. A resistor 22 is connected between the control grid 16 and the junction of the resistors 18 and 19. A capacitor 23 is connected between an adjustable tap 24 of the potentiometer 19 and electrical ground, and functions to increase the amplitude of the L—R sidebands with respect to the L+R combination signal, at the output anode 26 of the tube 17, as is fully described in the aforesaid co-pending patent application. A load resistor 27 is connected between the anode 26 and a terminal 28 of B+ operating voltage.

A capacitor 29 and a resistor 31 are connected, in the order named, between the anode 26 and a tap 32 on a coil or winding 33. A capacitor 34 is connected and parallel with the winding 33, and one or both of the capacitor 34 and the winding 33 may be made adjustable or variable so that the elements 33 and 34 provide a resonant circuit tuned to be resonant at the 19 kc. frequency of the pilot signal. One end of the winding 33 is electrically grounded, and the other end is electrically coupled, via a capacitor 36, to the control grid 37 of an oscillator tube 38. A tap 39 on the winding 33 is connected to the cathode 41 of tube 38. A screen grid 42 of tube 38 is connected to the B+ terminal 28 via a resistor 43 and a parallel connected capacitor 44. A resistor 46 is connected between the control grid 37 and electrical ground.

A switching signal output winding 51 is connected at one end thereof to the anode 52 of tube 38. A capacitor 53 is connected in parallel with the output winding 51, and one or both of the winding 51 and capacitor 53 are made variable, the combination of the winding 51 and capacitor 53 being tuned to resonate at the 38 kc. frequency of the switching signal. A center tap 54 of the winding 51 is connected to the B+ voltage terminal 28.

The tube 38 and associated tuned circuits 33–34 and 51–53, form an oscillator and frequency doubler circuit, and function as a switching signal generator. This circuit oscillates at 19 kc., because of the positive feedback connections between the winding 33 and the tube 38, and at a phase under control of the 19 kc. pilot signal applied to the tap 32 of winding 33. The output tuned circuit 51, 53, being tuned to 38 kc., acts as a frequency doubler output circuit and hence is oscillatory at 38 kc., the phase of the 38 kc. oscillatory switching signal in this output circuit being controlled by the phase of the pilot signal at the input circuit 33–34 of the oscillator.

Capacitors 56 and 57 are respectively connected between the ends of the switching signal circuit output winding 51 and switching signal input terminals 58, 59 of a sampling circuit. A filter 61 is connected between the junction of capacitor 29 and resistor 31, and a composite signal input terminal 62 of the sampling circuit. The filter 61, which may comprise a parallel combination of an inductor and capacitor, as shown, is tuned to reject the 67 kc. "storecasting" signals which are sometimes transmitted along with the stereophonic signals, to insure that only the composite signal will be applied to the input terminal 62. A resistor 63 is connected between the input terminal 62 and electrical ground, and resistors 66 and 67 are respectively connected between the composite signal input terminal 62 and the switching signal input terminals 58 and 59.

The sampling circuit includes a "left" sampling circuit comprising a pair of diodes 68, 69 connected in series with like polarity, this series combination being connected, in series with a biasing network comprising a parallel combination of a capacitor 71 and a resistor 72, across the sampling circuit input terminals 58 and 59. Similarly, a "right" sampling circuit comprises a pair of diodes 73 and 74 connected in series with like polarity, which are connected, in series with a biasing parallel combination of a capacitor 76 and a resistor 77, across the terminals 58 and 59. The pair of diodes 73, 74 are connected across the terminals 58, 59 (in series with the combination 76–77) with a polarity opposite to that with which the diodes 68–69 are connected.

A capacitor 81 is connected between electrical ground and the junction of the diodes 68–69, and functions to smooth out and temporarily store the samples of the "left" signal. A de-emphasis network comprises a resistor 82 connected between the junction of diodes 68–69 and a "left" signal output terminal 83, and a capacitor 84 connected between the terminal 83 and electrical ground. A resistor 86 is connected between the terminal 83 and electrical ground, to provide a discharge path for the capacitors 81 and 84. Similarly, a smoothing capacitor 87 is connected between electrical ground and the junction of the diodes 73–74, and a de-emphasis network for the "right" signal channel comprises a resistor 88 connected between the junction of diodes 73–74 and a "right" signal output terminal 89, and a capacitor 91 connected between the terminal 89 and electrical ground. A resistor 92 is connected between the terminal 89 and electrical ground, to provide a discharge path for the capacitors 87 and 91.

The circuit functions as follows. A composite signal, which appears at the output terminal 13 of the F.M. receiver 12, is amplified by the amplifier tube 17, and is applied through the capacitor 29 and the filter 61, to the composite signal input terminal 62 of the sampling circuit. The composite signal also is applied, through resistor 31 (to provide impedance isolation of the signal) to the switching signal oscillator coil 33, which is selectively oscillatory, in combination with capacitor 34, at the 19 kc. frequency of the 19 kc. pilot signal. The pilot signal controls both the frequency and phase of this oscillation. The output tuned circuit 51–53 of this switching signal generator, being tuned at 38 kc., oscillates at, and provides, a 38 kc. switching signal. This switching signal is coupled, via capacitors 56 and 57, to the sampling circuit.

During the half-cycles of this switching signal when the upper end of winding 51 is positive and the lower end thereof is negative, both of the diodes 68 and 69 will be biased into a conductive condition because of their polarity in the circuit between the two ends of the winding 51. While the diodes 68 and 69 are conductive during this half-cycle of the switching signal, the composite signal passes through the resistor 66, the biasing network 71–72, and diode 68, to the output of the sampling circuit, and also at the same time passes through the resistor 67 and diode 69 to the output of the sampling circuit. If the sampling signal is properly phased with respect to the suppressed sub-carrier signal, in the manner to be described, this sampling of the composite signal during a half-cycle of the switching signal, will provide a "left" signal at the output terminal 83.

During the other half-cycles of the switching signal, i.e., when the upper end of winding 51 is negative and the lower end thereof is positive, both of the diodes 73 and 74 will be rendered conductive, due to the polarity of their connection across the winding 51, whereupon the composite signal during these half-cycles will pass to the output of the "right" sampler via two concurrent paths, viz, through resistor 67 and diode 74, and also through resistor 66, biasing network 76–77, and diode 73, so that during these sampling intervals a "right" signal will appear at the output terminal 89. The small-amplitude pilot signal of the composite signal, is substantially eliminated by the de-emphasis networks 82, 83 and 88, 91.

In the circuit shown, the left signal will be produced at output terminal 83, and the right signal will be produced at output terminal 90, if the switching signal has a particular phase with respect to the L—R sidebands of the composite signal, and if the coupling capacitors 56 and 57 are connected to apply the switching signal to the terminals 58 and 59 with a given phasing, and if the pairs of sampling diodes 68, 69 and 73, 74 are connected with a given polarity in their circuit. Reversal of any one or all three items, i.e., a 180° change in phase of the switching signal with respect to the L—R sidebands, or an interchange of the connection of the condensers 56 and 57 between the respective ends of the winding 51 and the sampling circuit input terminals 58, 59, or reversal of the polarities with which the diodes 68, 69, and 73, and 74 are connected in the circuit, will cause the "right" signal to be produced at the output terminal 83, and the "left" signal to be produced at the output terminal 89. However, a reversal of two of the foregoing three items, will cause production of the "left"

signal at the output terminal 83 and the "right" signal at the output terminal 89, as shown. These phase relationships are well-known to those skilled in the art.

The biasing networks 71, 72 and 76, 77, build up D.C. voltages thereon during the conductive periods of the sampling circuits, so that when the sampling diodes are intended to be off during alternate half-cycles, the biasing voltage developed on the biasing networks will bias the respective pairs of diodes to their non-conducting conditions.

Normally, a secondary winding would be employed in lieu of the capacitors 56, 57, and the resistors 66, 67, this secondary winding being inductively coupled to the output winding 51, and the ends of the secondary winding being respectively connected to the sampling circuit input terminals 58 and 59. The composite signal input terminal 62 would be connected to the center point of the secondary winding. With such a conventional arrangement, the switching signal applied to the terminals 58 and 59 would not properly be in phase with the L—R sidebands of the composite signal applied at terminal 62, due to the fact that the compensating network 19, 23 in the cathode circuit of the amplifier tube 17, which is for the purpose of relatively increasing the amplitude of the L—R sideband component of the composite signal, per the above-mentioned co-pending patent application, causes an undesired time-delay in the L—R sidebands. This time-delay in the L—R sidebands, in relation to the timing of the switching signal, undesirably reduces the amplitude of the output signals L and R at terminals 83 and 89, and also causes some small amount of "R" signal to appear with the "left" output signal at terminal 83, and also causes an undesired small amount of "L" signal to appear with the "right" output signal at terminal 89. To correct this, it has been known to detune one or both of the tuned circuits 33–34 and 51, 53. Such detuning causes a time-delay of the switching signal corresponding to the time-delay of the L—R sidebands, so that proper phasing of these two signals is achieved. However, as mentioned heretofore, such detuning of these circuits is difficult to accurately achieve, and makes it difficult for the service man to adjust the tuning of these circuits properly, because it is difficult to accurately detune a circuit so that a sloping side of its characteristic curve falls at a given frequency. Such detuning has the further drawback that it makes these tuned circuits drift quickly out of adjustment due to changes in temperature, and furthermore it reduces the lock-in or control range of the switching signal with respect to the 19 kc. pilot signal.

According to the present invention, the switching signal generator secondary winding that normally is used, is eliminated, and in its place the coupling circuit comprising capacitor 56 and resistor 66 is connected between one end of the switching winding 51 and an input terminal 58 of the sampling circuit, and another coupling circuit comprising the capacitor 57 and resistor 59, is connected between the other end of the switching signal winding 51 and the other switching input terminal 59 of the sampling circuit, as shown. The time constants of the couplings 56, 66 and 57, 67, are chosen so as to impart a time delay to the switching signal that is applied to the terminals 58 and 59, this time delay being equal to that of the L—R sidebands, and being such as to cause proper timing and phasing of the switching signal with respect to the L—R sidebands, in the sampling circuit. The proper values for capacitors 56 and 57, and for the resistors 66 and 67, in order to achieve the required time delay, can be determined experimentally or by mathematical calculations. By way of example, if the capacitor 23 has a value of 0.01 microfarads, and the potentiometer 19 has a value of 1,500 ohms, these values being determinative of the time delay of the L—R sidebands, then suitable values for the capacitors 56 and 57 will be 220 micro-microfarads each, and the resistors 66 and 67 will be 4,700 ohms each, in order to delay the switching signal a proper amount so that it will be in exact phase with the L—R sidebands in the sampling circuit.

By using the invention just described, the tuned circuits 33, 34 and 51, 53 may be tuned exactly to 19 kc. and 38 kc., respectively, which is easily achieved with ordinary test instruments, both at the factory, and by service repairmen. Since, in accordance with the invention, these tuned circuits are peaked at the desired frequencies, any slight drifting in their tuning due to temperature effects, will have none, or only very slight, effect on the operation of the circuit. Also, in accordance with the invention, these time-delay networks 56, 66 and 57, 67, also function as coupling networks between the switching signal output winding 51 and the sampling circuit input terminals 58, 59, and thus they serve two functions and eliminate the need for a secondary winding for coupling the switching signal from the winding 51 to the sampling circuit input terminals 58 and 59. Also, it is found advantageous to thus delay the switching signal at its point of greatest amplitude rather than attempting to delay it at an earlier part of the circuit where it would be of lesser amplitude, or to try to delay the relatively lower amplitude 19 kc. pilot signal.

A further advantage of the invention is, that, in addition to achieving proper timing of the switching signal with respect to the L—R sidebands, and in addition to eliminating the secondary winding that would otherwise be employed, the use of the two capacitors and two resistors in lieu of the secondary winding, can be more economical than would be the use of a good quality secondary winding. Furthermore, if it should be found that the separation of the left and right stereo output signals is not quite perfect, this separation can be easily maximized by only slightly detuning one or both of the tuned circuits 33, 34 and 51, 53. Preferably, the switching signal tuned circuit 51, 53 will always be tuned for maximum switching signal output amplitude, and then if necessary, the 19 kc. tuned circuit 33, 34 will be slightly detuned for the best compromise of stereo signal separation and optimum stability of the circuitry.

Although particular circuits have been shown, by way of example, for the switching signal generator, for the sampling circuit, and for the means causing a time delay in the L—R sidebands, various other circuit means can be employed for these purposes without departing from the inventive concept of providing a time-delay coupling circuit for the switching signal.

While a preferred embodiment of the invention has been shown and described, various other embodiments and modifications thereof will be apparent to those skilled in the art, and will fall within the scope of the invention as defined in the following claims.

What we claim is:

1. A circuit for deriving two audio frequency signals from a composite signal containing the sum of the two audio signals and sideband components of the difference of the two audio signals which are related to a suppressed reference wave, said sideband components being delayed in time with respect to said reference wave, said circuit comprising a switching signal generator circuit for providing a switching signal related in frequency and phase to said reference wave, a sampling circuit for deriving said audio signals from said composite signal, means to apply said composite signal to said sampling circuit, and coupling means connected to said sampling circuit to apply said switching signal thereto, said coupling means having a time delay characteristic for delaying said switching signal by an amount substantially corresponding to the time delay of said sideband components with respect to said reference wave.

2. A circuit as claimed in claim 1, in which said coupling means comprises a series capacitance and a shunt resistance for said switching signal, said capacitance and resistance having values of capacitance and resistance to provide said time delay characteristic.

3. A circuit for deriving two audio frequency signals from a composite signal containing the sum of the two audio signals and sideband components of the difference of the two audio signals which are related to a suppressed reference wave, said sideband components being delayed in time with respect to said reference wave, said circuit comprising a switching signal generator circuit for providing a switching signal related in frequency and phase to said reference wave, said switching signal generator including an output winding for said switching signal, a sampling circuit for deriving said audio signals from said composite signal and having a first input terminal for said composite signal and a pair of input terminals for said switching signal, means to apply said composite signal to said first input terminal, and switching signal coupling means connected between said output winding and said pair of terminals and comprising a pair of capacitors respectively connected between different points on said output winding and the terminals of said pair of input terminals, and a pair of resistors respectively connected between said terminals of the pair of input terminals and said first input terminal, said capacitors and resistors having values of capacitance and resistance to couple said switching signal to said sampling circuit with a time delay substantially corresponding to the time delay of said sideband components with respect to said reference wave.

4. A circuit for deriving two audio frequency signals from a composite signal containing the sum of the two audio signals, sideband components of the difference of the two audio signals which are related to a suppressed reference wave, and a pilot signal related in frequency and phase to said suppressed reference wave, said circuit comprising an amplifier circuit for said composite signal which includes means for relatively increasing the amplitude of said sideband components with respect to said sum of the two signals, said means causing a time delay of said sideband components with respect to said reference wave, a switching signal generator circuit comprising an oscillator having a resonant oscillatory circuit tuned to the frequency of said pilot signal, means connected to apply the composite signal from the output of said amplifier circuit to said resonant oscillatory circuit, a resonant inductance-capacitance output circuit for said switching signal generator connected to the output of said oscillator and tuned to the frequency of said reference wave for providing a switching signal, a sampling circuit comprising a first pair of series-connected diodes connected with like polarity across two input terminals, a second pair of series-connected diodes connected with like polarity across said two input electrodes, said first and second pairs of diodes being connected with mutually unlike polarity across said two input terminals, output means for one of said audio signals connected to the junction of said first pair of diodes, output means for the other of said audio signals connected to the junction of said second pair of diodes, and signal coupling means connected to said two input terminals comprising a first coupling capacitor connected between a point of the inductance of said output circuit and one of said two input terminals, a second coupling capacitor connected between another point of said inductance and the other of said two input terminals, a pair of resistors connected in series between said two input terminals, and means for coupling the composite signal from the output of said amplifier circuit to the junction of said pair of resistors, said coupling capacitors and said resistors being given sufficiently small values of capacitance and resistance for providing a sufficiently short time constant to impart a time delay to said switching signal substantially corresponding to said time delay of the sideband components with respect to the reference wave.

References Cited by the Examiner

UNITED STATES PATENTS 3,133,993 5/1964 De Vries ------------ 179—15

OTHER REFERENCES

Crowhurst: "Filters for FM-Stereo," Audio, August 1961, pages 26–28, 32 and 34.

DAVID G. REDINBAUGH, *Primary Examiner.*

ROBERT L. GRIFFIN, *Examiner.*